US00RE50578E

(19) United States
(12) Reissued Patent
Shi

(10) Patent Number: US RE50,578 E
(45) Date of Reissued Patent: *Sep. 2, 2025

(54) METHOD, APPARATUS, AND SYSTEM FOR SUPPORTING MULTIPLE IMSIS

(71) Applicant: Huawei Device Co., Ltd., Dongguan (CN)

(72) Inventor: Jieping Shi, Shenzhen (CN)

(73) Assignee: Huawei Device Co., Ltd., Dongguan (CN)

( * ) Notice: This patent is subject to a terminal disclaimer.

(21) Appl. No.: 18/235,723

(22) Filed: Aug. 18, 2023

Related U.S. Patent Documents

Reissue of:
(64) Patent No.: 8,718,711
Issued: May 6, 2014
Appl. No.: 13/693,419
Filed: Dec. 4, 2012

U.S. Applications:
(63) Continuation of application No. 17/405,904, filed on Aug. 18, 2021, now Pat. No. Re. 49,635, which is an (Continued)

(51) Int. Cl.
*H04M 1/00* (2006.01)
*H04L 61/50* (2022.01)

(Continued)

(52) U.S. Cl.
CPC ..... *H04W 8/183* (2013.01); *H04L 61/50* (2022.05); *H04W 8/26* (2013.01); *H04W 12/02* (2013.01);

(Continued)

(58) Field of Classification Search
CPC ..... H04W 12/06; H04W 12/02; H04W 8/26; H04W 8/183; H04W 12/72; H04L 61/50; H04L 2101/654
See application file for complete search history.

(56) References Cited

U.S. PATENT DOCUMENTS 6,978,156 B1 12/2005 Papadopoulos et al.
2005/0117566 A1 6/2005 Davidson (Continued)

FOREIGN PATENT DOCUMENTS

CN 1787681 6/2006
CN 1787681 A 6/2006

(Continued)

OTHER PUBLICATIONS

International Search Report of PCT/CN2010/073885 mailed Mar. 24, 2011.

(Continued)

*Primary Examiner* — Ovidio Escalante
(74) *Attorney, Agent, or Firm* — Leydig, Voit & Mayer, Ltd.

(57) ABSTRACT

Embodiments of the present invention disclose a method, an apparatus, and a system for supporting multiple IMSIs. The method includes: receiving a response message that is returned by a server in response to an IMSI update request message and transmitted by a user terminal; and executing an IMSI update operation for a smart card according to information carried in the response message, where the smart card is a smart card supporting multiple IMSIs, and the IMSI update operation for the smart card includes: an operation of adding an IMSI in the smart card or an operation of deleting an IMSI from the smart card. The foregoing technical solution may dynamically update an IMSI in the smart card, thereby avoiding a phenomenon that one user must occupy multiple IMSIs all along, improving a utilization ratio of IMSIs, and saving IMSI resources.

6 Claims, 6 Drawing Sheets

Related U.S. Application Data application for the reissue of Pat. No. 8,718,711, which is a continuation of application No. PCT/CN2010/073885, filed on Jun. 12, 2010.

(51) Int. Cl.

| | |
|---|---|
| ***H04W 8/18*** | (2009.01) |
| ***H04W 8/26*** | (2009.01) |
| ***H04W 12/02*** | (2009.01) |
| ***H04W 12/06*** | (2021.01) |
| *H04L 101/654* | (2022.01) |
| *H04W 12/72* | (2021.01) |

(52) U.S. Cl.

CPC ..... *H04W 12/06* (2013.01); *H04L 2101/654* (2022.05); *H04W 12/72* (2021.01)

(56) References Cited

U.S. PATENT DOCUMENTS

| | | | | |
|---|---|---|---|---|
| 2005/0282584 | A1* | 12/2005 | Faisy | H04W 8/205 455/558 |
| 2006/0183500 | A1* | 8/2006 | Choi | H04W 8/265 713/168 |
| 2010/0190473 | A1 | 7/2010 | Ishikawa | |
| 2010/0330986 | A1 | 12/2010 | Rahman et al. | |
| 2011/0193718 | A1 | 8/2011 | Chevrette et al. | |
| 2012/0102556 | A1 | 4/2012 | Tapia et al. | |
| 2012/0173743 | A1 | 7/2012 | Yu | |

FOREIGN PATENT DOCUMENTS

| | | | |
|---|---|---|---|
| CN | 101312583 | A | 11/2008 |
| CN | 101399659 | A | 4/2009 |
| CN | 101692730 | A | 4/2010 |
| CN | 101720085 | | 6/2010 |
| CN | 101720085 | A | 6/2010 |
| EP | 1045598 | A1 | 10/2000 |
| JP | 1998-178476 | A | 6/1998 |
| JP | 2004064657 | A | 2/2004 |
| JP | 2007166610 | A | 6/2007 |
| KR | 100585791 | B1 | 6/2006 |
| WO | 98/56201 | A2 | 12/1998 |
| WO | WO 98/56201 | | 12/1998 |
| WO | WO 2008040848 | A1 * | 4/2008 |
| WO | WO2008/076031 | A1 | 6/2008 |
| WO | 2009/022978 | A1 | 2/2009 |
| WO | WO 2009/016684 | A1 | 2/2009 |
| WO | WO 2009/022978 | | 2/2009 |

OTHER PUBLICATIONS

PCT Written Opinion of the International Searching Authority mailed Mar. 24, 2011, issued in corresponding to PCT Patent Application No. PCT/CN2010/073885.

Extended European Search Report dated Feb. 6, 2013, issued in corresponding European Patent Application No. 10852707.8.

Japanese Office Action mailed Oct. 22, 2013 in corresponding Japanese Application No. 2013-502984 (2 pages) (2 pages English Translation).

* cited by examiner

METHOD, APPARATUS, AND SYSTEM FOR SUPPORTING MULTIPLE IMSIS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*More than one reissue application has been filed for reissue of U.S. Pat. No. 8,718,711 issued on May 6, 2014.* This application is *an application for reissue of U.S. Pat. No. 8,718,711, and is a continuation reissue of application Ser. No. 17/405,904, filed on Aug. 18, 2021, which is also an application for reissue of U.S. Pat. No. 8,718,711. U.S. Pat. No. 8,718,711 is* a continuation of International Application No. PCT/CN2010/073885, filed on Jun. 12, 2010, which is hereby incorporated by reference in its entirety.

FIELD OF THE INVENTION

The present invention relates to the field of network communication technologies, and in particular, to a technology for supporting multiple IMSIs.

BACKGROUND OF THE INVENTION

At present, multiple International Mobile Subscriber Identities (international mobile subscriber identity, IMSI) may be preset in a smart card, that is, a user sets up multiple accounts. According to needs, the user may select one IMSI from multiple IMSIs to use. The foregoing smart card may be a Subscriber Identity Module (subscriber identity module, SIM) card, and so on.

During a process of implementing the present invention, the inventor finds that: IMSIs set in the existing smart card are relatively fixed, that is, after IMSIs are preset in the smart card, the IMSIs in the smart card cannot be changed, and the multiple IMSIs in the smart card can only be used by one user. Therefore, one user must occupy multiple IMSIs, which leads to a low utilization ratio of IMSIs, and eventually results in waste of IMSI resources.

SUMMARY OF THE INVENTION

Implementation manners of the present invention provide a method, an apparatus, and a system for supporting multiple IMSIs, where the method, the apparatus, and the system may dynamically update an IMSI in a smart card, thereby avoiding a phenomenon that one user must occupy multiple IMSIs all along, improving a utilization ratio of IMSIs, and saving IMSI resources.

An implementation manner of the present invention provides a method for supporting multiple IMSIs, where the method includes:

receiving a response message that is returned by a server in response to an IMSI update request message and transmitted by a user terminal; and executing an IMSI update operation for a smart card according to information carried in the response message, where the smart card is a smart card supporting multiple IMSIs, and the IMSI update operation for the smart card includes: an operation of adding an IMSI in the smart card and/or an operation of deleting an IMSI from the smart card.

An implementation manner of the present invention provides a method for supporting multiple IMSIs, where the method includes:

receiving an IMSI update request message sent by a user terminal;

executing an IMSI management operation according to the IMSI update request message; and returning a response message to the user terminal according to an execution result of the IMSI management operation, where the IMSI management operation includes: when the IMSI update request message includes an IMSI application request message, assigning a new IMSI and authentication data for the user terminal, and/or, when the IMSI update request message includes an IMSI deletion request message, recycling an IMSI according to the IMSI deletion request message.

An implementation manner of the present invention provides an apparatus for supporting multiple IMSIs, where the apparatus includes:

a first receiving module, configured to receive a response message that is returned by a server in response to an IMSI update request message and transmitted by a user terminal; and an update module, configured to execute an IMSI update operation for a smart card according to information carried in the response message, where the smart card is a smart card supporting multiple IMSIs, and the IMSI update operation for the smart card includes: an operation of adding an IMSI in the smart card and/or an operation of deleting an IMSI from the smart card.

An implementation manner of the present invention provides a user terminal, which includes a control module and an apparatus for supporting multiple IMSIs, where the control module is configured to send an IMSI update request message to a server, and after receiving a response message that is returned by the server in response to the IMSI update request message, send the response message to the apparatus for supporting multiple IMSIs; where the IMSI update request message includes: an IMSI application request message and/or an IMSI deletion request message; and the apparatus for supporting multiple IMSIs is configured to receive the response message sent by the control module, and execute an IMSI update operation for a smart card according to information carried in the response message, where the smart card is a smart card supporting multiple IMSIs, and the IMSI update operation for the smart card includes: an operation of adding an IMSI in the smart card and/or an operation of deleting an IMSI from the smart card.

An implementation manner of the present invention provides a server, which includes:

a second receiving module, configured to receive an IMSI update request message sent by a user terminal;

a management module, configured to execute an IMSI management operation according to the IMSI update request message; and a second sending module, configured to return a response message to the user terminal according to an execution result of the IMSI management operation, where the IMSI management operation includes: when the IMSI update request message includes an IMSI application request message, the management module assigns a new IMSI and authentication data for the user terminal, and/or, when the IMSI update request message includes an IMSI deletion request message, the management module recycles an IMSI according to the IMSI deletion request message.

An implementation manner of the present invention provides a system for supporting multiple IMSIs, where the system includes: the foregoing server and at least one foregoing user terminal.

An implementation manner of the present invention provides a method for supporting multiple IMSIs, where the method includes:

sending an IMSI update request message to a server, where the IMSI update request message includes: an IMSI application request message and/or an IMSI deletion request message;

receiving a response message that is returned by the server in response to the IMSI update request message; and transmitting the response message to a smart card, so that the smart card executes an IMSI update operation for a smart card according to information carried in the response message, where the smart card is a smart card supporting multiple IMSIs, and the IMSI update operation for the smart card includes: an operation of adding an IMSI in the smart card and/or an operation of deleting an IMSI from the smart card.

It can be known from the description of the foregoing technical solutions that, in the embodiments, an IMSI update request message such as an IMSI application request message or an IMSI deletion request message is sent to a server, so that the server can return a corresponding response message for a user terminal according to the IMSI update request message. In this way, according to the response message returned by the server and transmitted by the user terminal, an operation of adding an IMSI in a smart card may be executed or an operation of deleting an IMSI from a smart card may be executed, so that the IMSI in the smart card may be dynamically updated, and the user terminal may dynamically occupy the IMSI, thereby avoiding a phenomenon that one user must occupy multiple IMSIs all along, improving a utilization ratio of IMSIs, and saving IMSI resources.

BRIEF DESCRIPTION OF THE DRAWINGS

To illustrate the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art can further derive other drawings according to these accompanying drawings without creative efforts.

DETAILED DESCRIPTION OF THE EMBODIMENTS

Specific implementation processes of the technology for supporting multiple IMSIs of the present invention are illustrated by examples through embodiments in the following. Apparently, the embodiments to be described in the following are only a part of rather than all of the embodiments of the present invention. All other embodiments which are derived by persons of ordinary skill in the art based on the embodiments of the present invention without making creative efforts shall fall within the protection scope of the present invention.

Embodiment 1: a method for supporting multiple IMSIs. A process of the method is as shown in FIG. 1.

Figure 1:
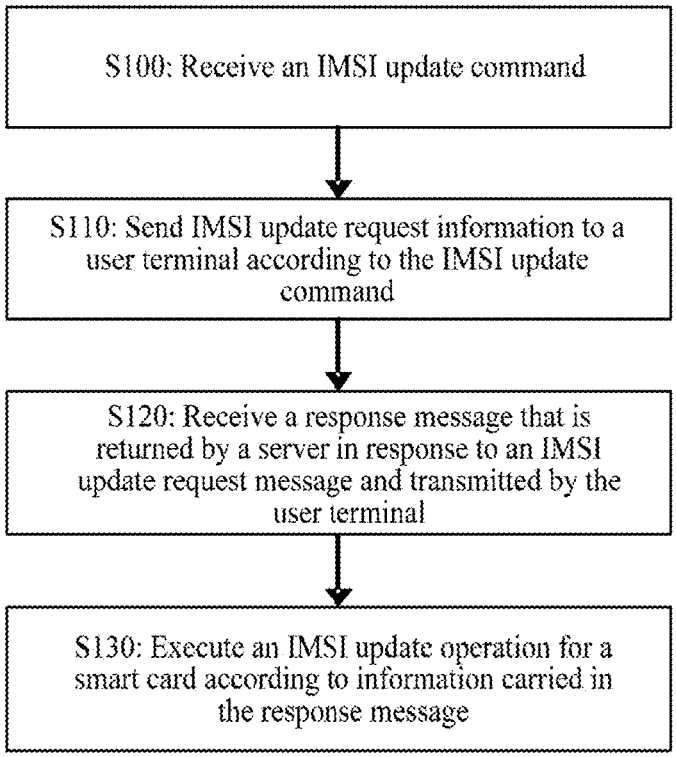
FIG. 1 is a flow chart of a method for supporting multiple IMSIs according to Embodiment 1 of the present invention.

The process in FIG. 1 include S100, S110, S120, and S130, where S100 and S110 are optional steps, that is, Embodiment 1 may only include S120 and S130 which are shown in FIG. 1.

S100: Receive an IMSI update command. The IMSI update command may be a command transmitted by a user terminal. The user terminal may generate an IMSI update command after receiving IMSI update request information which is externally input, and transmit the IMSI update command to an execution subject of S100. The IMSI update request information received by the user terminal may represent contents such as that a user needs to apply for a new IMSI or a user needs to delete a certain IMSI. The IMSI update command generated by the user terminal according to the IMSI update request information may also represent contents such as that the user needs to apply for the new IMSI or the user needs to delete a certain IMSI. The foregoing IMSI update command may be an IMSI update command based on an envelope command, that is, the IMSI update command adopts a form of the envelope command. The foregoing IMSI update command may also adopt a command of another form except the envelope command, and in this embodiment, a specifically-adopted protocol type and a specific format of the command which are of the IMSI update command are not limited.

S110: After receiving the IMSI update command, send IMSI update request information to the user terminal according to the IMSI update command, so as to trigger the user terminal to send an IMSI update request message to a server according to the IMSI update request information. The IMSI update request message may be an IMSI application request message, and may also be an IMSI deletion request message. The IMSI application request message is used to apply for a new IMSI for the user terminal, and the IMSI deletion request message is used to cancel a certain IMSI occupied by the user terminal. The IMSI deletion request message may carry IMSI information which needs to be deleted, such as an IMSI and authentication data. The authentication data here is authentication data corresponding to the IMSI. The foregoing IMSI update request information may be sent to the user terminal based on the form of the envelope command, and may also adopt a command of another form except the envelope command, and in this embodiment, the specifically-adopted protocol type and the specific format which are of the IMSI update request information are not limited.

The execution subject of S110 may encrypt the IMSI update request information, and transmit the encrypted information to the user terminal. In addition, the execution subject of S110 may also transmit information which is used for security authentication and the foregoing encrypted information to the user terminal. Content included in the information which is used for security authentication may be set according to a specific form of actual security authentication. For example, the information which is used for security authentication includes identity information of the smart card. In this embodiment, a specific implementation manner of security authentication, content specifically included in the information which is used for security authentication, and a specific implementation manner of encryption are not limited.

The foregoing IMSI update request message may be sent to the server by the user terminal through a form of an Over The Air (over the air, OTA) short message. Definitely, the IMSI update request message may also be sent to the server through another form except the OTA short message. For example, the IMSI update request message is sent to the server through a Bearer Independent Protocol (bearer independent protocol, BIP). In this embodiment, the protocol type specifically adopted by the IMSI update request message and the content specifically included in the IMSI update request message are not limited.

It should be particularly noted for the foregoing S100 and S110 that, the foregoing S100 and S110 describe a process where the user terminal passively sends the IMSI update request message to the server according to triggering. In fact, the user terminal may also actively send the IMSI update request message to the server. In this embodiment, the specific implementation manner that the user terminal sends the IMSI update request message to the server is not limited.

S120: Receive a response message that is returned by the server in response to the received IMSI update request message and transmitted by the user terminal.

After the user terminal receives the response message returned by the server, the response message may be transmitted to an execution subject of S120 by using a protocol between the user terminal and the execution subject of S120. The response message returned by the server may carry information which is used for executing an operation of adding an IMSI in the smart card, such as assigning a new IMSI and authentication data corresponding to the IMSI to the user terminal. The response message may also carry information which is used for executing an operation of deleting an IMSI from the smart card, such as deletion permission information (that is, recycling success information). Optionally, the information which is used for executing the operation of deleting an IMSI from the smart card may include an IMSI needing to be deleted, or include an IMSI and authentication data that corresponds to the IMSI which need to be deleted. The user terminal may transmit the response message returned by the server to the execution subject of S120 through the response message which is based on the envelope command. In this embodiment, the protocol type specifically adopted by the response message transmitted by the user terminal to the execution subject of S120, and the specific command format of the response message are not limited.

S130: Execute an IMSI update operation for a smart card according to information carried in the received response message. The smart card here is a smart card supporting multiple IMSIs. The foregoing IMSI update operation for the smart card may include: at least one of an operation of adding an IMSI in the smart card and an operation of deleting an IMSI from the smart card. It should be noted that, the operation of adding an IMSI in the smart card includes: adding an IMSI and authentication data corresponding to the IMSI in the smart card. The operation of deleting an IMSI from the smart card includes: deleting an IMSI and authentication data corresponding to the IMSI from the smart card. The operation of adding an IMSI and the operation of deleting an IMSI which are recorded in the following embodiments are also the same, which are not described in detail again.

In S130, after receiving the response message, the execution subject may perform security authentication on the received response message according to the information carried in the response message, for example, perform security authentication on the response message by using server identity information carried in the response message. After the security authentication is passed, the execution subject executes an IMSI update operation for the smart card according to the information carried in the response message. If the response message sent by the server is an encrypted response message, after the security authentication is passed, the execution subject of S130 further needs to decrypt the received response message, and execute the IMSI update operation for the smart card according to information obtained by decrypting. In addition, the execution subject of S130 may judge after decryption whether the information obtained after decryption is complete and valid, and if it is judged to be complete and valid, execute the IMSI update operation for the smart card according to the information obtained after decryption; and if it is judged to be not complete or valid, may not execute the IMSI update operation for the smart card.

The information carried in the foregoing response message may include: a response command type representing applying for a new IMSI, the newly applied IMSI (that is, a new IMSI assigned for the user terminal) and authentication data. The information carried in the response message may also include: a response command type representing deleting an IMSI and information indicating whether recycling is successful, and optionally may further include: an IMSI and authentication data which need to be deleted.

The execution subject of S130 may add a newly applied IMSI and the authentication data in the response message to the smart card according to a response command type of the applied new IMSI. The execution subject of S130 may also determine, according to the response command type of deleting an IMSI, a certain IMSI that the user needs to delete as indicated by the IMSI update command which corresponds to the response message, and delete the IMSI and authentication data corresponding to the IMSI from the smart card. In a case where the response message carries an IMSI and authentication data which need to be deleted, the execution subject of S130 may delete the IMSI and the authentication data corresponding to the IMSI which are carried in the response message from the smart card.

Optionally, the execution subject of S130 may output an execution condition of the IMSI update operation for the smart card, so that the user can know whether a new IMSI is successfully applied, or whether a certain IMSI is successfully deleted.

It should be particularly noted that, in a general case, the smart card is a smart card which is set independently of the user terminal, while in some cases, the smart card may also be fixed in the user terminal. The smart card in this embodiment may be a smart card which is set independently of the user terminal, and may also be a smart card which is fixed in the user terminal. In addition, the execution subject in this embodiment may be set in the smart card, and may also be set independently of the smart card. In this embodiment, a specific existence manner of the smart card and the execution subject is not limited.

It can be known from the description in the foregoing Embodiment 1 that, IMSI update request information is sent to the user terminal to trigger the user terminal to send the IMSI update request message, such as an IMSI application request message or an IMSI deletion request message, to the server, so that the server can return a corresponding response message to the user terminal according to the IMSI update request message. In this way, according to the response message received by the user terminal, an operation of adding an IMSI in the smart card may be executed or an operation of deleting an IMSI from the smart card may be executed, so that the IMSI in the smart card may be dynamically updated, and the user terminal may dynamically occupy the IMSI, thereby avoiding a phenomenon that one user must occupy multiple IMSIs all along. Operations such as security authentication and decryption are performed on the response message received by the user terminal, thereby ensuring the security of the IMSI update operation for the smart card. Finally, in Embodiment 1, a utilization ratio of IMSIs is improved, and IMSI resources are saved.

Embodiment 2: a method for supporting multiple IMSIs. A process of the method is as shown in FIG. 2.

Figure 2:
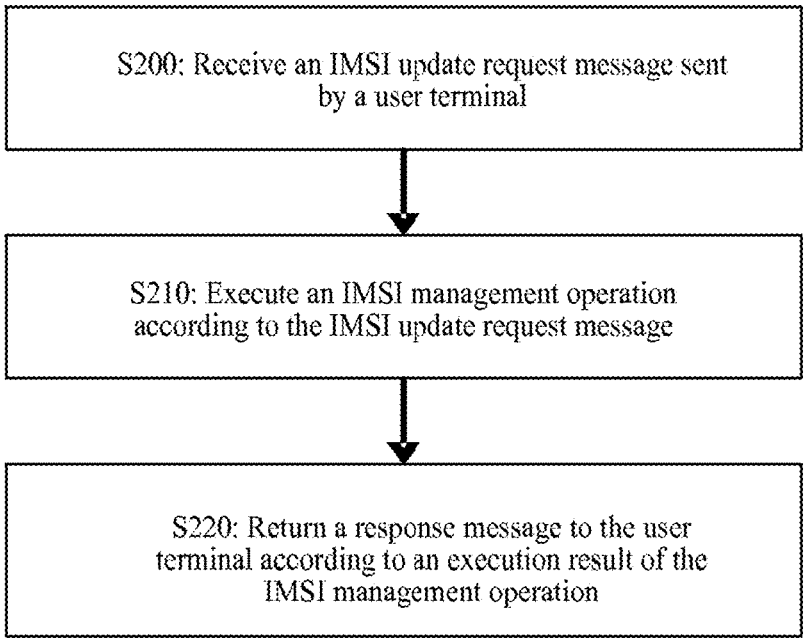
FIG. 2 is a flow chart of a method for supporting multiple IMSIs according to Embodiment 2 of the present invention.

In FIG. 2, S200: Receive an IMSI update request message sent by a user terminal. The IMSI update request message here may be an IMSI application request message, and may also be an IMSI deletion request message. The IMSI update request message received in S200 may be in a form based on an OTA short message, and may also be another form.

S210: Execute an IMSI management operation according to the received IMSI update request message. The IMSI management operation here may be: when the IMSI update request message is an IMSI application request message, assigning a new IMSI and authentication data for the user terminal. The IMSI management operation may also be: when the IMSI update request message is an IMSI deletion request message, recycling an IMSI according to the IMSI deletion request message. The recycling the IMSI may be such as: unbinding a binding relationship between the IMSI and the authentication data corresponding to the IMSI and the user terminal.

After the IMSI update request message is received, security authentication may be performed according to information carried in the IMSI update request message first. For example, security authentication is performed on the IMSI update request message by using smart card identity information carried in the IMSI update request message. If the security authentication is passed, the IMSI management operation is performed according to the received IMSI update request message. If the security authentication fails (that is, not passed), the IMSI management operation is not performed. In this embodiment, the existing security authentication manner may be adopted to perform security authentication on the IMSI update request message, and in this embodiment, a specific implementation process of security authentication is not limited.

If the IMSI update request message is encrypted, an execution subject of S210 may decrypt the information carried in the IMSI update request message, and then execute the IMSI management operation according to the decrypted information. For example, after the security authentication is passed, the information carried in the IMSI update request message is decrypted, and the IMSI management operation is executed according to the decrypted information. In this embodiment, the specific implementation process of decryption is not limited.

S220: Return a response message to the user terminal according to an execution result of the IMSI management operation.

The response message here carries information which is used for executing an IMSI update operation for a smart card, and the IMSI update operation for the smart card may include: at least one of an operation of adding an IMSI in the smart card and an operation of deleting an IMSI from the smart card.

When the IMSI update request message is an IMSI application request message (that is, the IMSI update operation for the smart card is the operation of adding an IMSI in the smart card), an execution subject of S220 may carry a new IMSI and authentication data which are assigned for the user terminal in the response message, and return the response message to the user terminal.

When the IMSI update request message is an IMSI deletion request message (that is, the IMSI update operation for the smart card is the operation of deleting an IMSI from the smart card), the execution subject of S220 may carry deletion permission information (that is, recycling success information) or deletion forbidding information (that is, recycling failure information) in the response message, and return the response message to the user terminal.

The foregoing response message may be sent to the user terminal through a form of an OTA short message. Definitely, the response message may also be sent to the user terminal through another form except the OTA short message. For example, the response message is sent to the user terminal through a BIP. In this embodiment, a protocol type specifically adopted by the response message and a specific command format of the response message are not limited.

The execution subject of S220 may encrypt the information needing to be carried in the response message, carry the encrypted information in the response message, and return the response message carrying the encrypted information to the user terminal. For example, a new IMSI and authentication data corresponding to the IMSI which are assigned are encrypted, and then the encrypted IMSI and authentication data are carried in the response message and sent to the user terminal. For another example, deletion permission information or deletion forbidding information is encrypted, and the encrypted information is carried in the response message and sent to the user terminal. In this embodiment, a specific implementation process of encryption is not limited.

Embodiment 3: a method for supporting multiple IMSIs. A process of the method is as shown in FIG. 3.

Figure 3:
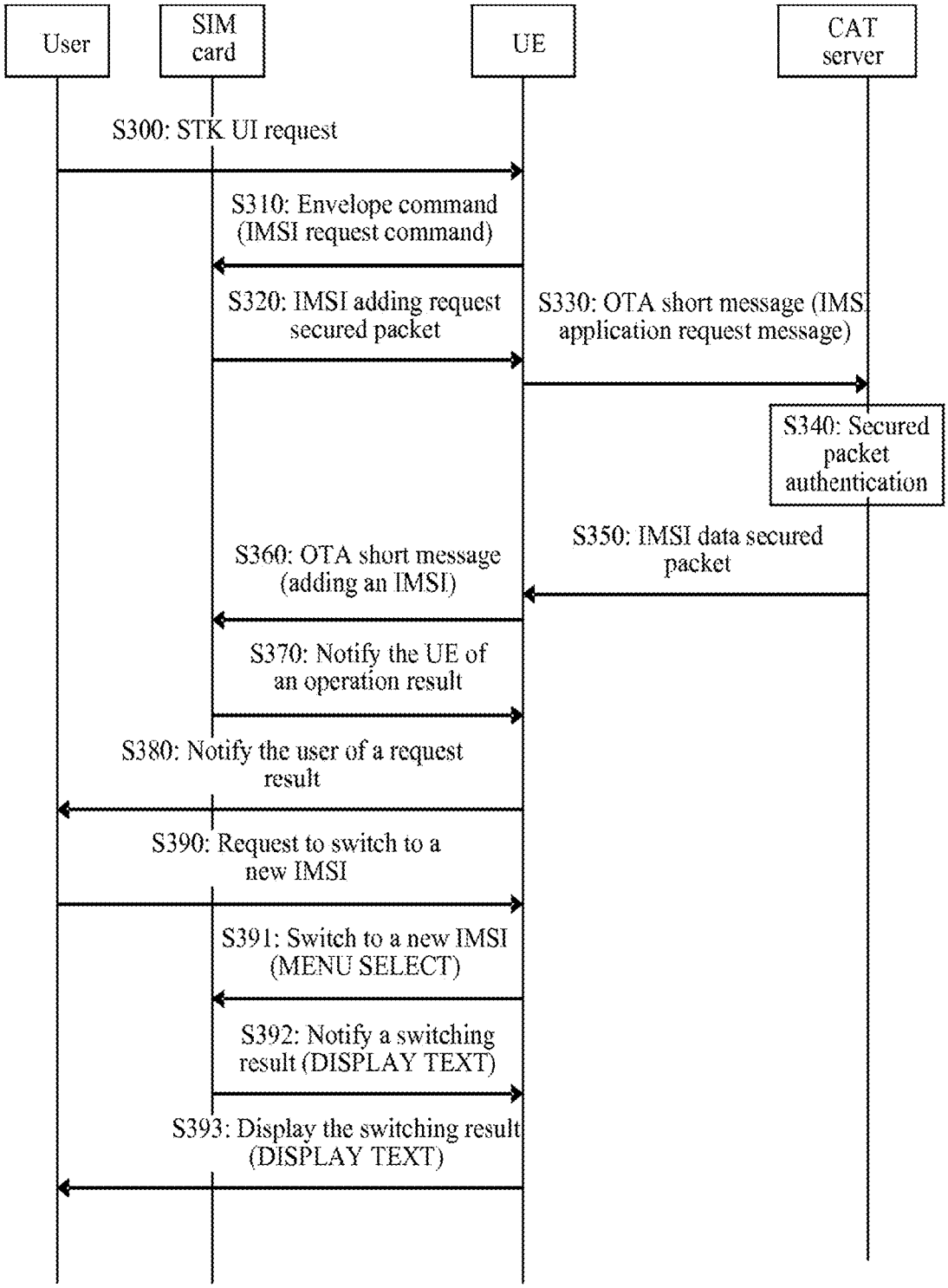
FIG. 3 is a flow chart of a method for supporting multiple IMSIs according to Embodiment 3 of the present invention.

In FIG. 3, S300: A user requests to add an IMSI through a UE STK (User Equipment SIM Toolkit, user equipment SIM toolkit) application. For example, the user inputs IMSI adding request information through the UE STK to request to add a local IMSI of one certain area.

S310: After receiving the IMSI adding request information, a UE invokes an envelope command (such as a menu select MENU Select command) to send an IMSI update command to a SIM card so as to trigger a process of adding an IMSI.

S320: After receiving the IMSI update command, the SIM card sends an IMSI adding request secured packet to the UE, so as to trigger the UE to send an OTA short message to a CAT server (that is, a server that manages and controls a file system of the SIM card through an air interface). The IMSI adding request secured packet includes information which is used for security authentication and encrypted information.

S330: After receiving the IMSI adding request secured packet, the UE sends the OTA short message to the CAT server (that is, the IMSI adding request secured packet is encapsulated in the OTA short message and sent to the CAT server), so as to request the CAT server to assign a new IMSI for a user terminal.

S340: After receiving the OTA short message, the CAT server performs security authentication on the IMSI adding request secured packet in the OTA short message.

S350: After the security authentication is passed, the CAT server sends an IMSI data secured packet to the user terminal. The IMSI data secured packet carries a local IMSI of one certain area and authentication data corresponding to the IMSI which are newly assigned for the user terminal. The IMSI and the authentication data corresponding to the IMSI which are newly assigned may be carried in the IMSI adding request secured packet after encryption. The IMSI adding request secured packet may include information which is used for security authentication and encrypted information. The IMSI data secured packet is sent to the user terminal through a form of the OTA short message (that is, the IMSI data secured packet is encapsulated in the OTA short message and sent to the user terminal).

S360: After receiving the IMSI data secured packet that is transmitted by the CAT server through the form of the OTA short message, the UE does not perform operations such as encryption and decryption on the IMSI data secured packet in the OTA short message, but transmits the IMSI data secured packet in the OTA short message to the SIM card through a Short Message Services point-to-point Download (short message services point-to-point download, SMS PP Download) command.

S370: After receiving the SMS PP Download command, the SIM card performs security authentication on the IMSI data secured packet in the command. After the security authentication is passed, the SIM card decrypts the IMSI data secured packet. If it is determined that the decrypted information is complete and valid, the SIM card stores the IMSI and the authentication data which are obtained after decryption. If it is determined that the decrypted information is not complete or valid, the SIM card does not perform an operation of storing the IMSI and the authentication data. After successfully adding a new IMSI, the SIM card sends to the UE notification information of successfully adding a new IMSI. In addition, if a new IMSI is not successfully added, the SIM card also should send to the UE notification information of not successfully adding a new IMSI.

S380: After receiving the notification information, the UE displays the notification information of successfully adding a new IMSI, so that the user knows an execution result of the IMSI adding request.

S390: When selecting to use the newly added IMSI, the user inputs request information of switching to the new IMSI.

S391: The UE transmits the request information of switching to the new IMSI to the SIM card, and the UE may invoke a MENU Select command to transmit the request information of switching to the new IMSI to the SIM card.

S392: The SIM card executes the received MENU Select command, and transmits information about an execution result of the MENU Select command to the UE through a Display Text (display text) command.

S393: The UE displays the information about the execution result of the MENU Select command in the Display Text command, so that the user knows whether the new IMSI is successfully switched to.

Embodiment 4: a method for supporting multiple IMSIs. A process of the method is as shown in FIG. 4.

Figure 4:
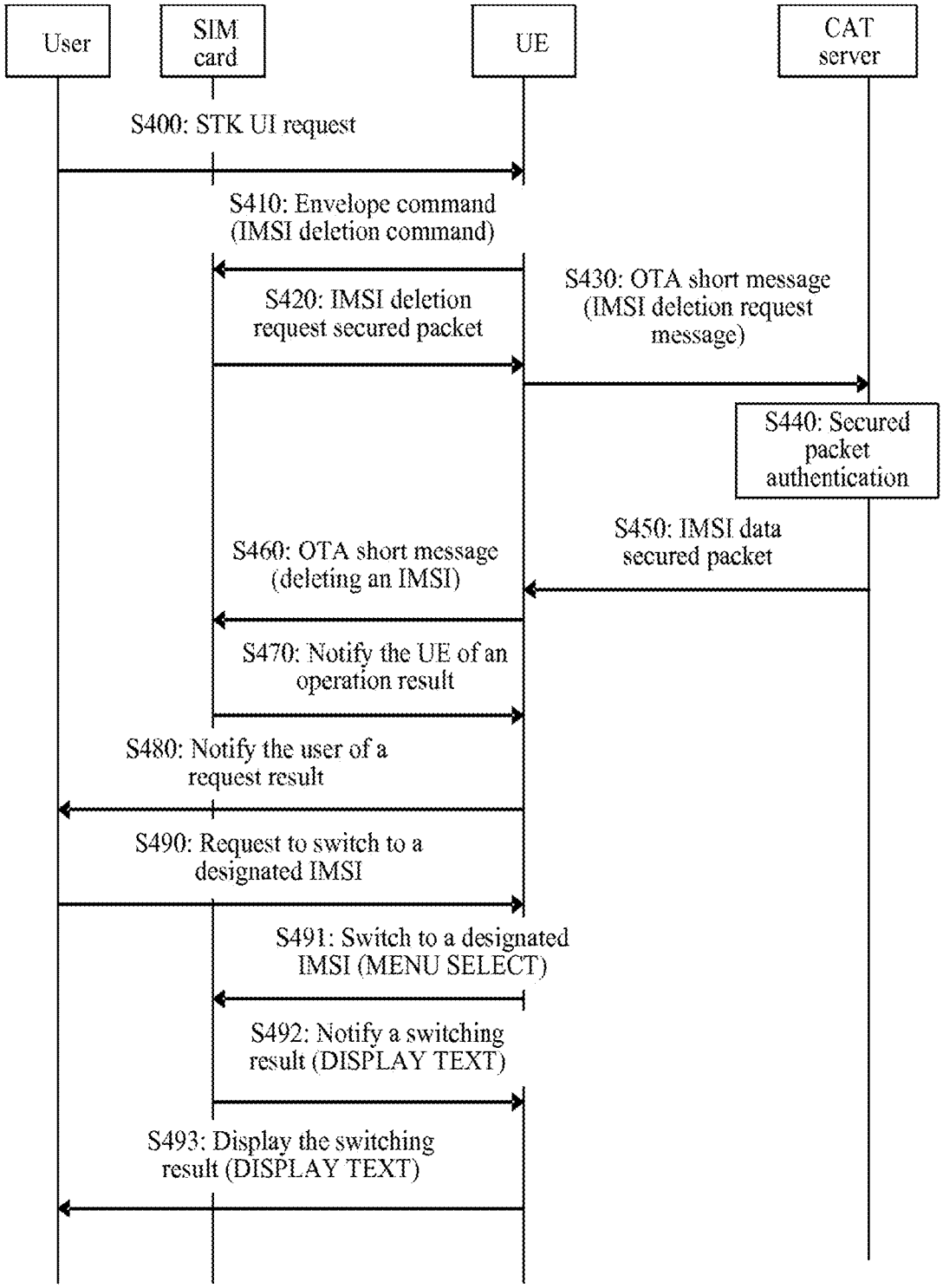
FIG. 4 is a flow chart of a method for supporting multiple IMSIs according to Embodiment 4 of the present invention.

In FIG. 4, S400: A user requests to delete an IMSI through a UE STK application. For example, the user inputs information of an IMSI deletion request message through the UE STK to request to delete a local IMSI of one certain area.

S410: After receiving the information of the IMSI deletion request message, a UE invokes an envelope command (such as a menu select MENU Select command) to send an IMSI update command to a SIM card so as to trigger a process of deleting the IMSI.

S420: After receiving the IMSI update command, the SIM card sends an IMSI deletion request secured packet to the UE, so as to trigger the UE to send an OTA short message to a CAT server. The IMSI deletion request secured packet includes: information which is used for security authentication and encrypted information. The encrypted information includes: an IMSI and authentication data corresponding to the IMSI which need to be deleted.

S430: After receiving the IMSI deletion request secured packet, the UE sends the OTA short message to the CAT server (that is, the IMSI deletion request secured packet is encapsulated in the OTA short message and sent to the CAT server), so as to request the CAT server to delete an IMSI which is assigned for a user terminal.

S440: After receiving the OTA short message, the CAT server performs security authentication on the IMSI deletion request secured packet in the OTA short message.

S450: After the security authentication is passed, the CAT server decrypts the encrypted information carried in an IMSI data secured packet to obtain the IMSI and the authentication data which need to be deleted, the CAT server recycles the IMSI according to the obtained IMSI and authentication data, and then the CAT server sends the IMSI data secured packet to the user terminal. The IMSI data secured packet carries information which is used for security authentication and encrypted information. The encrypted information includes information obtained after encrypting recycling success information. The IMSI data secured packet is sent to the user terminal through a form of the OTA short message (that is, the IMSI data secured packet is encapsulated in the OTA short message and sent to the user terminal).

S460: After receiving the IMSI data secured packet in the OTA short message that is transmitted by the CAT server, the UE does not perform operations such as encryption and decryption on the IMSI data secured packet in the OTA short message, but transmits the IMSI data secured packet in the OTA short message to the SIM card through a SMS PP Download command.

S470: After receiving the SMS PP Download command, the SIM card performs security authentication on the IMSI data secured packet in the command. After the security authentication is passed, the SIM card decrypts the IMSI data secured packet. If it is determined that the decrypted information is complete and valid, the SIM card deletes, according to the recycling success information obtained after decryption, the IMSI and the authentication data which need to be deleted and are stored in the SIM card. If it is determined that the decrypted information is not complete or valid, the SIM card does not perform a deletion operation. After successfully deleting the IMSI, the SIM card sends to the UE notification information of successfully deleting the IMSI. In addition, if the IMSI is not successfully deleted, the SIM card should also send to the UE notification information of not successfully deleting the IMSI.

S480: After receiving the notification information, the UE displays the notification information of successfully deleting the IMSI, so that the user knows an execution result of an IMSI deletion request.

S490: When selecting to use another IMSI, the user inputs request information of switching to a designated IMSI.

S491: The UE transmits the request information of switching to the designated IMSI to the SIM card, and the UE may invoke a MENU Select command to transmit the request information of switching to the designated IMSI to the SIM card.

S492: The SIM card executes the received MENU Select command, and transmits information about an execution result of the MENU Select command to the UE through a Display Text command.

S493: The UE displays the information about the execution result of the MENU Select command in the Display Text command, so that the user knows whether the designated IMSI is successfully switched to.

Embodiment 5: an apparatus for supporting multiple IMSIs. The apparatus may be set in a smart card (such as a SIM card), and may also be set independently of the smart card. A structure of the apparatus is as shown in FIG. 5.

Figure 5:
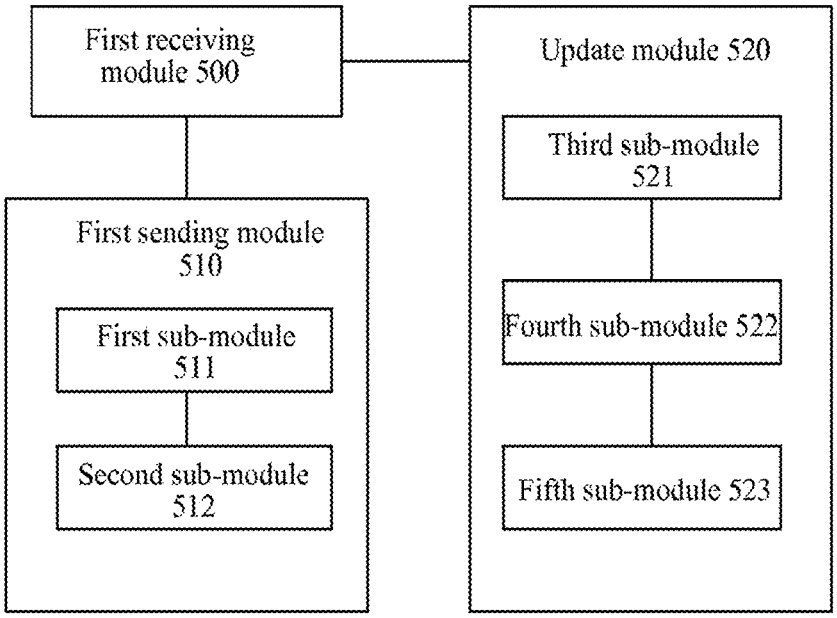
FIG. 5 is a schematic diagram of an apparatus for supporting multiple IMSIs according to Embodiment 5 of the present invention.

The apparatus in FIG. 5 includes: a first receiving module 500 and an update module 520. Optionally, the apparatus may further include: a first sending module 510.

The first receiving module 500 is configured to receive a response message that is returned by a server in response to an IMSI update request message and transmitted by a user terminal. Optionally, the first receiving module is further configured to receive an IMSI update command.

The IMSI update command received by the first receiving module 500 may be a command transmitted by the user terminal, and the user terminal may generate the IMSI update command after receiving IMSI update request information which is externally input, and transmit the IMSI update command to the apparatus for supporting multiple IMSIs. The IMSI update request information received by the user terminal may represent contents such as that a user needs to apply for a new IMSI or a user needs to delete one certain IMSI. The IMSI update command generated by the user terminal according to the IMSI update request information may also represent contents such as that the user needs to apply for a new IMSI or the user needs to delete one certain IMSI. The IMSI update command received by the first receiving module 500 may be an IMSI update command which is based on an envelope command. The IMSI update command received by the first receiving module 500 may also adopt a command of another form except the envelope command, and in this embodiment, a protocol type specifically adopted by the IMSI update command and a specific format of the command are not limited.

The first sending module 510 is configured to send IMSI update request information to the user terminal according to the IMSI update command received by the first receiving module 500, so as to trigger the user terminal to send an IMSI update request message to the server according to the IMSI update request information. The IMSI update request message here includes: an IMSI application request message or an IMSI deletion request message.

The IMSI update request message here may be an IMSI application request message, and may also be an IMSI deletion request message. The IMSI application request message is used to apply a new IMSI for the user terminal, and the IMSI deletion request message is used to delete one certain IMSI occupied by the user terminal. The IMSI deletion request message may carry IMSI information needing to be deleted, such as an IMSI and authentication data. The authentication data here is authentication data corresponding to the IMSI. The first sending module 510 may send the IMSI update request information to the user terminal based on a form of the envelope command, and the first sending module 510 may also adopt a command of another form except the envelope command to send the IMSI update request information to the user terminal, and in this embodiment, a specific protocol type and a specific format which are adopted by the first sending module 500 to send the IMSI update request information are not limited.

The first sending module 510 may include: a first sub-module 511 and a second sub-module 512.

The first sub-module 511 is configured to, according to the IMSI update command received by the first receiving module 500, determine the IMSI update request information, and encrypt the IMSI update request information.

The second sub-module 512 is configured to transmit information obtained after encryption by the first sub-module 511 and information which is used for security authentication to the user terminal. For example, the second sub-module 512 sends the foregoing information obtained after encryption and the information which is used for security authentication to the user terminal based on the form of the envelope command.

The update module 520 is configured to execute an IMSI update operation for a smart card according to information carried in the response message received by the first receiving module 500. The smart card here is a smart card supporting multiple IMSIs, and the IMSI update operation for the smart card may be an operation of adding an IMSI in the smart card, and may also be an operation of deleting an IMSI from the smart card. Optionally, the update module 520 may output an execution condition of the IMSI update operation for the smart card, so that the user can know whether a new IMSI is successfully applied, or whether a certain IMSI is successfully deleted.

The update module may include: a third sub-module 521, a fourth sub-module 522, and a fifth sub-module 523.

The third sub-module 521 is configured to perform security authentication on the response message received by the first receiving module 500. For example, the third sub-module 521 performs security authentication on the response message by using server identity information carried in the response message.

The fourth sub-module 522 is configured to decrypt the response message after the security authentication performed by the third sub-module 521 is passed. The information obtained after decryption by the fourth sub-module 522 may include: a new IMSI and authentication data which are assigned for the user terminal. The information obtained after decryption by the fourth sub-module 522 may also include: information indicating whether recycling is successful. In this embodiment, a specific implementation process of decrypting the response message by the fourth sub-module 522 is not limited.

The fifth sub-module 523 is configured to execute the IMSI update operation for the smart card according to the information obtained after decryption by the fourth sub-module 522.

Optionally, the fifth sub-module 523 may judge whether the information obtained after decryption is complete and valid. After it is judged to be complete and valid, the fifth sub-module 523 executes the IMSI update operation for the smart card according to the information obtained after decryption. After it is judged to be not complete or valid, the fifth sub-module 523 may not execute the IMSI update operation for the smart card.

Optionally, the fifth sub-module 523 may output the execution condition of the IMSI update operation for the smart card, so that the user can know whether a new IMSI is successfully applied, or whether one certain IMSI is successfully deleted.

Embodiment 6: a user terminal. A structure of the user terminal is as shown in FIG. 6.

Figure 6:
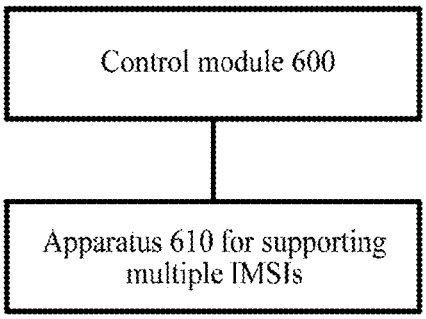
FIG. 6 is a schematic diagram of a user terminal according to Embodiment 6 of the present invention.

The user terminal in FIG. 6 includes: a control module 600 and an apparatus 610 for supporting multiple IMSIs. The apparatus 610 for supporting multiple IMSIs here may be a smart card (such as a SIM card), and may also be set independently of the smart card.

The control module 600 is configured to send an IMSI update request message to a server, and after receiving a response message that is returned by the server in response to the IMSI update request message, send the response message to the apparatus 610 for supporting multiple IMSIs. The IMSI update request message here includes: at least one of an IMSI application request message and an IMSI deletion request message.

The control module 600 may also be configured to send an IMSI update command to the apparatus 610 for supporting multiple IMSIs according to received IMSI update request information, so that after receiving the IMSI update command, the apparatus 610 for supporting multiple IMSIs sends IMSI update request information to it; and send the IMSI update request message to the server after receiving the IMSI update request information. Definitely, the control module 600 may also actively send the IMSI update request message to the server, that is, the control module 600 sends the IMSI update request message to the server in a case that the IMSI update request information sent by the apparatus 610 for supporting multiple IMSIs is not received The control module 600 may send the IMSI update request message to the server through a form of an OTA short message. Definitely, the control module 600 may also adopt another form except the OTA short message to send the IMSI update request message to the server. For example, the control module 600 sends the IMSI update request message to the server through a BIP. In this embodiment, a protocol type specifically adopted by the control module 600 for sending the IMSI update request message and content specifically included in the IMSI update request message are not limited.

After receiving the response message returned by the server, the control module 600 may transmit the response message to the apparatus 610 for supporting multiple IMSIs through a protocol between the control module 600 and the apparatus 610 for supporting multiple IMSIs. For example, the control module 600 may transmit the response message returned by the server to the apparatus 610 for supporting multiple IMSIs through a response message which is based on an envelope command. The response message returned by the server may carry information which is used for executing an operation of adding an IMSI in the smart card, such as a new IMSI and authentication data corresponding to the IMSI which are assigned by the server for the user terminal. The response message may also carry information which is used for executing an operation of deleting an IMSI from the smart card, such as deletion permission information (that is, recycling success information). Optionally, the information which is used for executing the operation of deleting an IMSI from the smart card may include an IMSI needing to be deleted, or include an IMSI and authentication data corresponding to the IMSI which need to be deleted. In this embodiment, a protocol type specifically adopted by the control module 600 for transmitting the response message to the apparatus 610 for supporting multiple IMSIs and a specific command format of the response message are not limited.

The apparatus 610 for supporting multiple IMSIs is configured to receive the response message sent by the control module 600, and execute an IMSI update operation for the smart card according to information carried in the response message. The smart card here is a smart card supporting multiple IMSIs, and the IMSI update operation for the smart card here includes: at least one of an operation of adding an IMSI in the smart card and an operation of deleting an IMSI from the smart card.

The apparatus 610 for supporting multiple IMSIs is further configured to receive the IMSI update command sent by the control module 600, and send IMSI update request information to the control module 600 according to the IMSI update command.

A specific structure of the apparatus 610 for supporting multiple IMSIs is as the description in the foregoing Embodiment 5, which is not repeatedly described here again.

Embodiment 7: a server. A structure of the server is as shown in FIG. 7.

Figure 7:
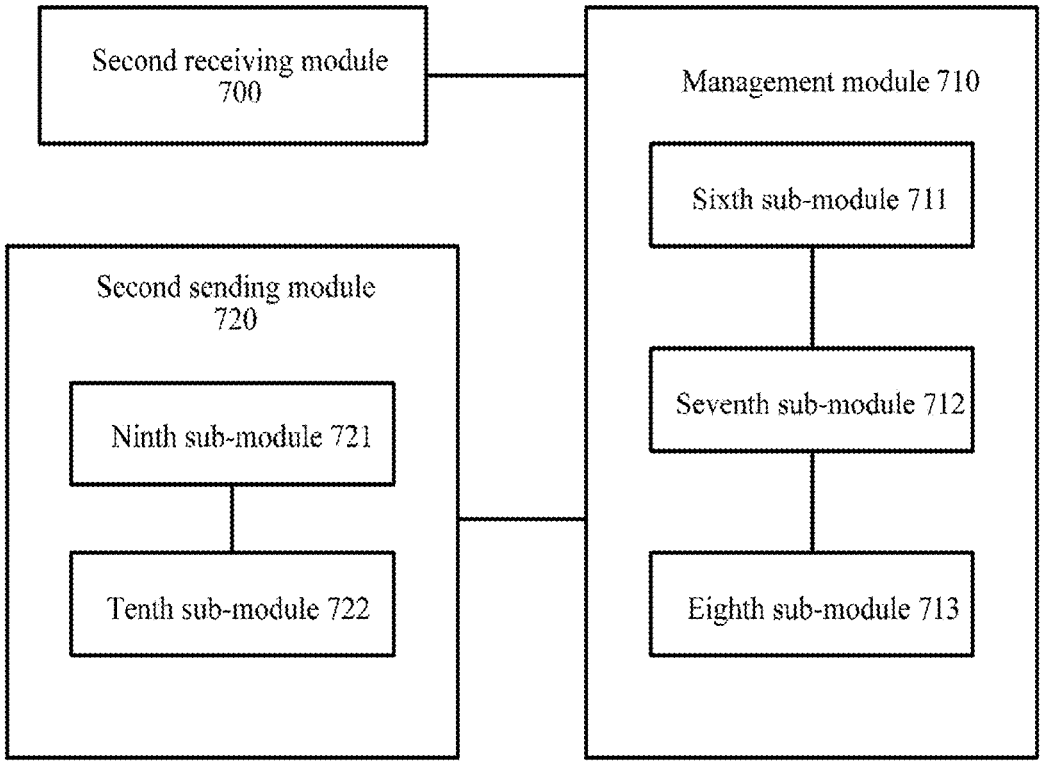
FIG. 7 is a schematic diagram of a server according to Embodiment 7 of the present invention.

The server shown in FIG. 7 includes: a second receiving module 700, a management module 710, and a second sending module 720.

The second receiving module 700 is configured to receive an IMSI update request message sent by a user terminal. The IMSI update request message here may be an IMSI application request message, and may also be an IMSI deletion request message. The IMSI update request message received by the second receiving module 700 may be in a form based on an OTA short message, and may also be in another form.

The management module 710 is configured to execute an IMSI management operation according to the IMSI update request message received by the second receiving module 700. The IMSI management operation executed by the management module 710 includes: when the IMSI update request message includes the IMSI application request message, the management module 710 assigns a new IMSI and authentication data for the user terminal. When the IMSI update request message includes the IMSI deletion request message, the management module 710 recycles an IMSI according to the IMSI deletion request message. For example, the management module 710 unbinds a binding relationship between an IMSI needing to be deleted and the user terminal.

The management module 710 may include: a sixth sub-module 711, a seventh sub-module 712, and an eighth sub-module 713.

The sixth sub-module 711 is configured to perform security authentication on the IMSI update request message received by the second receiving module 700. For example, the sixth sub-module 711 performs security authentication on the IMSI update request message by using smart card identity information carried in the IMSI update request message. The sixth sub-module 711 may adopt the existing security authentication manner to perform security authentication on the IMSI update request message, and in this embodiment, a specific implementation process that the sixth sub-module 711 performs security authentication is not limited.

The seventh sub-module 712 is configured to decrypt the IMSI update request message after the security authentication performed by the sixth sub-module 711 is passed. If the security authentication performed by the sixth sub-module 711 is not passed, the seventh sub-module 712 does not perform decryption. In this embodiment, a specific implementation process of decryption performed by the seventh sub-module 712 is not limited.

The eighth sub-module 713 is configured to execute the IMSI management operation according to information decrypted and obtained by the seventh sub-module 712. When the IMSI update request message is the IMSI application request message, the eighth sub-module 713 may assign a new IMSI and authentication data for the user terminal. When the IMSI update request message is the IMSI deletion request message, the eighth sub-module 713 may recycle an IMSI according to the IMSI deletion request message.

The second sending module 720 is configured to return a response message to the user terminal according to an execution result of the IMSI management operation executed by the management module 710. The response message here carries information which is used for executing an IMSI update operation for a smart card.

The second sending module 720 may carry a new IMSI and authentication data which are assigned for the user terminal by the management module 710 in the response message, and return the response message to the user terminal. The second sending module 720 may also carry deletion permission information (that is, recycling success information) or deletion forbidding information (that is, recycling failure information) in the response message, and return the response message to the user terminal.

The second sending module 720 may send the response message to the user terminal through a form of the OTA short message. Definitely, the second sending module 720 may also adopt another form except the OTA short message for sending to the user terminal. For example, the second sending module 720 sends the response message to the user terminal through a BIP. In this embodiment, a specific protocol type adopted by the second sending module 720 for sending the response message and a specific command format of the response message are not limited.

The second sending module 720 may include: a ninth sub-module 721 and a tenth sub-module 722.

The ninth sub-module 721 is configured to encrypt information about the execution result of the IMSI management operation executed by the management module 710. For example, the ninth sub-module 721 encrypts a new IMSI and authentication data corresponding to the IMSI which are assigned by the management module 710. For another example, the ninth sub-module 721 encrypts recycling success information or recycling failure information. In this embodiment, a specific implementation process of encryption performed by the ninth sub-module 721 is not limited.

The tenth sub-module 722 is configured to carry information obtained after encryption by the ninth sub-module 721 and information which is used for security authentication in the response message, and return the response message to the user terminal. The information which is used for security authentication is, such as identity information of the server.

Embodiment 8: a system for supporting multiple IMSIs. A structure of the system is as shown in FIG. 8.

Figure 8:
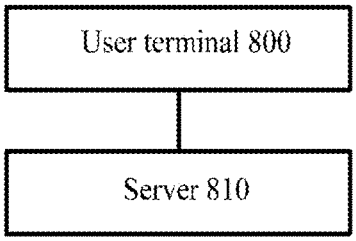
FIG. 8 is a schematic diagram of a system for supporting multiple IMSIs according to Embodiment 8 of the present invention.

The system shown in FIG. 8 includes: a user terminal 800 (such as a UE) and a server 810. Although only one user terminal 800 is shown in FIG. 8, the number of the user terminals 800 may be multiple.

The user terminal 800 is configured to send an IMSI update request message to the server 810, where the IMSI update request message includes: at least one of an IMSI application request message and an IMSI deletion request message; and receive a response message that is returned by the server 810 in response to the IMSI update request message, and according to information carried in the response message, execute an IMSI update operation for a smart card. The smart card here is a smart card supporting multiple IMSIs, and the IMSI update operation for the smart card here includes: an operation of adding an IMSI in the smart card or an operation of deleting an IMSI from the smart card.

The server 810 is configured to execute an IMSI management operation according to the IMSI update request message sent by the user terminal 800, and return the response message to the user terminal 800 according to an execution result of the IMSI management operation.

The IMSI management operation executed by the server 800 includes: when the received IMSI update request message includes the IMSI application request message, assigning a new IMSI and authentication data for the user terminal 800, and when the received IMSI update request message includes the IMSI deletion request message, recycling an IMSI according to the IMSI deletion request message.

Specific operations executed by the user terminal 800 and the server 810 and specific structures are as described in the foregoing method and apparatus embodiments, which are not repeatedly described here again.

Embodiment 9: a method for supporting multiple IMSIs. A process of the method is as shown in FIG. 9.

Figure 9:
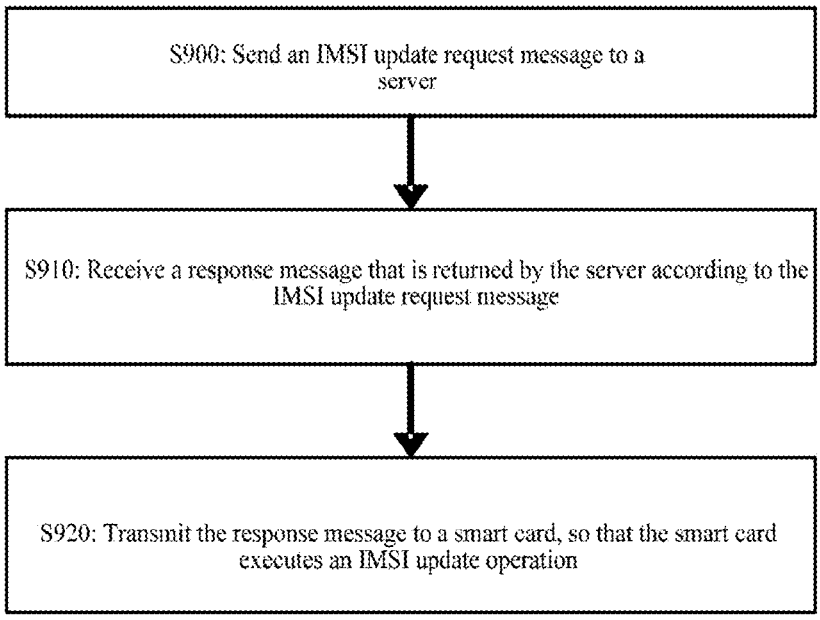
FIG. 9 is a flow chart of a method for supporting multiple IMSIs according to Embodiment 9 of the present invention.

In FIG. 9, S900: Send an IMSI update request message to a server, where the IMSI update request message includes: at least one of an IMSI application request message and an IMSI deletion request message.

Optionally, before S900, Embodiment 9 may further include: sending an IMSI update command to a smart card, and receiving IMSI update request information returned by the smart card, so that afterward, in S900, the IMSI update request message may be sent to the server according to the received IMSI update request information.

The IMSI update command in this embodiment may be an IMSI update command which is based on an envelope command, that is, the IMSI update command adopts a form of the envelope command. The foregoing IMSI update command may also adopt a command of another form except the envelope command, and in this embodiment, a protocol type specifically adopted by the IMSI update command and a specific format of the command are not limited.

The IMSI update request message in this embodiment may be sent to the server by a user terminal through a form of an OTA short message. Definitely, the IMSI update request message may also be sent to the server by adopting another form except the OTA short message. For example, the IMSI update request message is sent to the server through a BIP. In this embodiment, a protocol type specifically adopted by the IMSI update request message and content specifically included in the IMSI update request message are not limited.

The IMSI update request information received by an execution subject (such as the user terminal) in this embodiment may be encrypted IMSI update request information. In addition, information which is used for security authentication may be transmitted together with the encrypted IMSI update request information, that is, the user terminal may receive the information which is used for security authentication.

S910: Receive a response message that is returned by the server according to the IMSI update request message.

S920: Transmit the response message to the smart card, so that the smart card executes an IMSI update operation for the smart card according to information carried in the response message, where the smart card is a smart card supporting multiple IMSIs.

The executing, by the smart card, the IMSI update operation for the smart card according to the information carried in the response message includes: performing security authentication on the response message, and after the security authentication is passed, decrypting the response message, and executing the IMSI update operation for the smart card according to the decrypted information. The IMSI update operation for the smart card includes: at least one of an operation of adding an IMSI in the smart card and an operation of deleting an IMSI from the smart card. Specific operations executed by the smart card are as described in the foregoing embodiments, which are not repeatedly described here again.

Through the description of the foregoing implementation manners, persons skilled in the art may clearly understand that the present invention may be implemented through a manner of software plus a necessary hardware platform, and definitely may also be implemented all by hardware, but in many cases, the former one is an exemplary implementation manner. Based on such understanding, a part of or all of the technical solutions of the present invention that makes contributions to the background art may be embodied in a form of a software product. The software product may be used to execute the foregoing method process. The computer software product may be stored in a storage medium, for example, a ROM/RAM, a magnetic disk, or a compact disk, and includes several instructions which are used to enable a computer device (which may be a personal computer, a server, or a network device, and so on) to execute the method described in each embodiment of the present invention or certain parts of the embodiments.

Although the present invention is described through embodiments, persons of ordinary skill in the art should know that, there are a lot of variations and changes for the present invention without departing from the spirit of the present invention, and these variations and changes should be covered by the claims of the application document of the present invention.

What is claimed is:

[1. A method for supporting multiple international mobile subscriber identities IMSIs, comprising:

receiving a response message that is returned by a server in response to an IMSI update request message transmitted by a user terminal for an IMSI update operation for a smart card, wherein the IMSI update request message comprises: an IMSI application request message and/or an IMSI deletion request message, the IMSI application request message is used to apply to the server for a new IMSI, the IMSI deletion request message is used to cancel a certain IMSI occupied by the smart card; and executing the IMSI update operation for the smart card according to information carried in the response message, wherein the smart card is a smart card supporting multiple IMSIs, and the IMSI update operation for the smart card comprises: an operation of adding a new IMSI in the smart card according to the IMSI application request message and/or an operation of deleting an occupied IMSI from the smart card according to the IMSI deletion request message.]

[2. The method according to claim 1, wherein before the receiving the response message transmitted by the user terminal, the method comprises: receiving an IMSI update command, and sending IMSI update request information to the user terminal according to the IMSI update command, so as to trigger the user terminal to send the IMSI update request message to the server according to the IMSI update request information.]

[3. The method according to claim 2, wherein the IMSI update command comprises: an IMSI update command based on an envelope command, and/or, the IMSI update request message being sent through a form of an over the air OTA short message or a form of a bearer independent protocol.]

[4. The method according to claim 2, wherein:

the sending IMSI update request information to the user terminal comprises: encrypting the IMSI update request information, and transmitting the encrypted information and information which is used for security authentication to the user terminal; and/or the executing an IMSI update operation for a smart card according to information carried in the response message comprises:

performing security authentication on the response message, and after the security authentication is passed, decrypting the response message, and executing the IMSI update operation for the smart card according to the decrypted information.]

[5. A method for supporting multiple IMSIs, comprising:

receiving an IMSI update request message sent by a user terminal;

executing an IMSI management operation according to the IMSI update request message; and returning a response message to the user terminal according to an execution result of the IMSI management operation, wherein the IMSI management operation comprises: when the IMSI update request message comprises an IMSI application request message, assigning a new IMSI and authentication data for the user terminal, and/or, when the IMSI update request message comprises an IMSI deletion request message, recycling an occupied IMSI according to the IMSI deletion request message.]

[6. The method according to claim 5, wherein:

the executing the IMSI management operation according to the IMSI update request message comprises: performing security authentication on the IMSI update request message, and after the security authentication is passed, decrypting the IMSI update request message, and executing the IMSI management operation according to the information obtained by decrypting; and/or the returning the response message to the user terminal according to the execution result of the IMSI management operation comprises: encrypting information about the execution result of the IMSI management operation, carrying the encrypted information and information which is used for security authentication in the response message, and returning the response message to the user terminal.]

[7. An apparatus for supporting multiple IMSIs, comprising:

a first receiving module, configured to receive a response message that is returned by a server in response to an IMSI update request message transmitted by a user terminal for an IMSI update operation for a smart card, wherein the IMSI update request message comprises: an IMSI application request message and/or an IMSI deletion request message, the IMSI application request message is used to apply to the server for a new IMSI, the IMSI deletion request message is used to cancel a certain IMSI occupied by the smart card; and an update module, configured to execute the IMSI update operation for the smart card according to information carried in the response message, wherein the smart card is a smart card supporting multiple IMSIs, and the IMSI update operation for the smart card comprises: an operation of adding a new IMSI in the smart card according to the IMSI application request message and/or an operation of deleting an occupied IMSI from the smart card according to the IMSI deletion request message.]

[8. The apparatus according to claim 7, wherein the apparatus further comprises a first sending module, the first receiving module is further configured to receive an IMSI update command; and the first sending module is configured to send IMSI update request information to the user terminal according to the IMSI update command received by the first receiving module, so as to trigger the user terminal to send the IMSI update request message to the server according to the IMSI update request information.]

[9. The apparatus according to claim 8, wherein the first sending module comprises:

a first sub-module, configured to, according to the IMSI update command, determine the IMSI update request information, and encrypt the IMSI update request information; and a second sub-module, configured to transmit the encrypted information and information which is used for security authentication to the user terminal;

and/or, the update module comprises:

a third sub-module, configured to perform security authentication on the response message;

a fourth sub-module, configured to decrypt the response message after the security authentication is passed; and a fifth sub-module, configured to execute the IMSI update operation for the smart card according to the decrypted information.]

[10. A user terminal, comprising: a control module and an apparatus for supporting multiple IMSIs, wherein the control module is configured to send an IMSI update request message for an IMSI update operation for a smart card to a server, and after receiving a response message that is returned by the server in response to the IMSI update request message, send the response message to the apparatus for supporting a smart card with multiple IMSIs; wherein the IMSI update request message comprises: an IMSI application request message and/or an IMSI deletion request message, the IMSI application request message is used to apply to the server for a new IMSI, the IMSI deletion request message is used to cancel a certain IMSI occupied by the smart card; and the apparatus for supporting multiple IMSIs is configured to receive the response message sent by the control module, and execute the IMSI update operation for the smart card according to information carried in the response message, and the IMSI update operation for the smart card comprises: an operation of adding a new IMSI in the smart card according to the IMSI application request message and/or an operation of deleting an occupied IMSI from the smart card according to the IMSI deletion request message.]

[11. The user terminal according to claim 10, wherein the apparatus for supporting multiple IMSIs is further configured to receive an IMSI update command sent by the control module, and send IMSI update request information to the control module according to the IMSI update command; and the control module is further configured to send the IMSI update request message to the server according to the received IMSI update request information.]

[12. A server, comprising:

a receiving module, configured to receive an IMSI update request message sent by a user terminal;

a management module, configured to execute an IMSI management operation according to the IMSI update request message; and a sending module, configured to return a response message to the user terminal according to an execution result of the IMSI management operation, wherein the IMSI management operation comprises: when the IMSI update request message comprises an IMSI application request message, the management module assigns a new IMSI and authentication data for the user terminal, and/or, when the IMSI update request message comprises an IMSI deletion request message, the management module recycles an occupied IMSI according to the IMSI deletion request message.]

[13. The server according to claim 12, wherein the management module comprises:

a sub-module, configured to perform security authentication on the IMSI update request message;

a sub-module, configured to decrypt the IMSI update request message after the security authentication is passed; and a sub-module, configured to execute the IMSI management operation according to the information obtained by decrypting; and/or the second sending module comprises:

a sub-module, configured to encrypt information about the execution result of the IMSI management operation executed by the management module; and a sub-module, configured to carry the encrypted information and information which is used for security authentication in the response message, and return the response message to the user terminal.]

[14. A method for supporting multiple IMSIs, comprising:

sending an IMSI update request message for an IMSI update operation for a smart card to a server, wherein the IMSI update request message comprises: an IMSI application request message and/or an IMSI deletion request message, the IMSI application request message is used to apply to the server for a new IMSI, the IMSI deletion request message is used to cancel a certain IMSI occupied by the smart card;

receiving a response message that is returned by the server in response to the IMSI update request message; and transmitting the response message to the smart card, so that the smart card executes the IMSI update operation for the smart card according to information carried in the response message, wherein the smart card is a smart card supporting multiple IMSIs, and the IMSI update operation for the smart card comprises: an operation of adding a new IMSI in the smart card according to the IMSI application request message and/or an operation of deleting an occupied IMSI from the smart card according to the IMSI deletion request message.]

[15. The method according to claim 14, wherein before the sending the IMSI update request message to the server, the method further comprises: sending an international mobile subscriber identity IMSI update command to the smart card, and receiving IMSI update request information returned by the smart card, so as to send the IMSI update request message to the server according to the IMSI update request information.]

[16. The method according to claim 15, wherein the IMSI update command comprises: an IMSI update command based on an envelope command, and/or, the IMSI update request message being sent through a form of an over the air OTA short message or a form of a bearer independent protocol.]

[17. The method according to claim 15, wherein:

the IMSI update request information is encrypted, and a user terminal receives the encrypted IMSI update request information and information which is used for security authentication; and/or the executing the IMSI update operation for the smart card according to the information carried in the response message comprises:

performing security authentication on the response message, and after the security authentication is passed, decrypting the response message, and executing the IMSI update operation for the smart card according to the decrypted information.]

*18. A method for supporting multiple international mobile subscriber identities (IMSIs), comprising:*

*receiving a response message that is returned by a server in response to an IMSI update request message transmitted by a user terminal for an IMSI update operation for a smart card, wherein the IMSI update request message comprises: an IMSI application request message and/or an IMSI deletion request message, the IMSI application request message is used to apply to the server for a new IMSI, the IMSI deletion request message is used to cancel a certain IMSI occupied by the smart card; and*

*executing the IMSI update operation for the smart card according to information carried in the response message, wherein the smart card is a smart card supporting multiple IMSIs, and the IMSI update operation for the smart card comprises: an operation of adding a new IMSI in the smart card according to the IMSI application request message and/or an operation of deleting an occupied IMSI from the smart card according to the IMSI deletion request message;*

*wherein executing the IMSI update operation for the smart card according to the information carried in the response message comprises:*

*performing security authentication on the response message; and*

*after the security authentication is passed, decrypting the response message and executing the IMSI update operation for the smart card according to the decrypted information.*

*19. The method according to claim 18, wherein before receiving the response message transmitted by the user terminal, the method comprises:*

*receiving an IMSI update command, and sending IMSI update request information to the user terminal according to the IMSI update command, so as to trigger the user terminal to send the IMSI update request message to the server according to the IMSI update request information.*

*20. The method according to claim 19, wherein the IMSI update command comprises: an IMSI update command based on an envelope command, and/or, the IMSI update request message being sent through a form of an over the air (OTA) short message or a form of a bearer independent protocol.*

*21. The method according to claim 19, wherein sending the IMSI update request information to the user terminal comprises: encrypting the IMSI update request information, and transmitting the encrypted information and information which is used for security authentication to the user terminal.*

*22. A method for supporting multiple international mobile subscriber identities (IMSIs), comprising:*

*receiving an IMSI update request message sent by a user terminal;*

*executing an IMSI management operation according to the IMSI update request message; and*

*returning a response message to the user terminal according to an execution result of the IMSI management operation;*

*wherein the IMSI management operation comprises:*

*when the IMSI update request message comprises an IMSI application request message, assigning a new IMSI and authentication data for the user terminal; and/or*

*when the IMSI update request message comprises an IMSI deletion request message, recycling an occupied IMSI according to the IMSI deletion request message; and*

*wherein returning the response message to the user terminal according to the execution result of the IMSI management operation comprises:*

*encrypting information about the execution result of the IMSI management operation;*

*carving the encrypted information and information which is used for security authentication in the response message; and*

*returning the response message to the user terminal.*

*23. The method according to claim 22, wherein executing the IMSI management operation according to the IMSI update request message comprises:*

*performing security authentication on the IMSI update request message, and after the security authentication is passed, decrypting the IMSI update request message, and executing the IMSI management operation according to the information obtained by decrypting.*

* * * * *